United States Patent [19]

Scott

[11] Patent Number: 4,941,959

[45] Date of Patent: Jul. 17, 1990

[54] ELECTRIC FIELD-DRIVEN, MAGNETICALLY-STABILIZED FERRO-EMULSION PHASE CONTACTOR

[75] Inventor: Timothy C. Scott, Knoxville, Tenn.

[73] Assignee: Martin Marietta Energy Systems, Inc., Oak Ridge, Tenn.

[21] Appl. No.: 441,494

[22] Filed: Nov. 27, 1989

[51] Int. Cl.$^5$ ................................................ B03C 5/00
[52] U.S. Cl. ..................................... 204/186; 204/302
[58] Field of Search ............................... 204/186, 302

[56] References Cited

U.S. PATENT DOCUMENTS 4,767,515  8/1988  Scott et al. ........................... 204/186

OTHER PUBLICATIONS

Rosenweig, "Fluidization: Hydrodynamic Stabilization with a Magnetic Field", *Science*, vol. 204, Apr. 6, 1979.

Primary Examiner—T. M. Tufariello
Attorney, Agent, or Firm—Joseph A. Marasco; Bruce M. Winchell

[57] ABSTRACT

Methods and systems for interfacial surface area contact between a dispersed phase liquid and a continuous phase liquid in counter-current flow for purposes such as solvent extraction. Initial droplets of a dispersed phase liquid material containing ferromagnetic particles functioning as a "packing" are introduced to a counter-current flow of the continuous phase. A high intensity pulsed electric field is applied so as to shatter the initial droplets into a ferromagnetic emulsion comprising many smaller daughter droplets having a greater combined total surface area than that of the initial droplets in contact with the continuous phase material. A magnetic field is applied to control the position of the ferromagnetic emulsion for enhanced coalescence of the daughter droplets into larger reformed droplets.

8 Claims, 2 Drawing Sheets

ELECTRIC FIELD-DRIVEN, MAGNETICALLY-STABILIZED FERRO-EMULSION PHASE CONTACTOR

The U.S. Government has rights in this invention pursuant to Contract number DE-AC05-84OR21400 between the United States Department of Energy and Marietta Energy Systems, Inc.

BACKGROUND OF THE INVENTION

This invention is an improvement to the invention of Scott et al U.S. Pat. No. 4,767,515, patented Aug. 30, 1988, entitled "SURFACE AREA GENERATION AND DROPLET SIZE CONTROL IN SOLVENT EXTRACTION SYSTEMS UTILIZING HIGH INTENSITY ELECTRIC FIELDS", the entire disclosure of which is hereby expressly incorporated by reference.

The present invention relates generally to phase contactor methods and systems, such as for solvent extraction, wherein an emulsion is created for high interfacial surface area and, more particularly, to techniques for controlling the position and stability of the emulsion for enhanced coalescence.

Commercial solvent extraction systems are limited by the mass transfer rates of one or more chemical species between a continuous phase and a dispersed phase. Parameters limiting the mass transfer rate include surface area, convection, diffusion through each of the two phases, reaction rate and differences in chemical activity of the species in the two phases. Diffusion and chemical activity are determined by the system in use. The reaction rate is chemical in nature. Convection and surface area are physical considerations.

Two major problems which limit the use of solvent extraction in industrial applications are the efficient creation and control of mass transfer surface area. This surface area is the surface area of the dispersed phase in contact with the continuous phase. In practice, interfacial mass transfer surface area is usually created by a form of mechanical agitation or mixing. Generally, this mechanical agitation creates small droplets with a relatively high ratio of surface area to unit volume, as well as convection past the droplets. However, such mixing requires bulk movement of the continuous phase, thus decreasing the efficiency of the process. Since such systems require an energy input into the bulk of each liquid phase, energy is inefficiently used. In addition, agitation may create emulsions in the mass transfer apparatus which prove difficult to characterize and which can prove difficult to control during phase disengagement. Droplets can be difficult to coalesce, which can result in a significant increase in residence time within the apparatus. Moreover, mechanical mixers can break down causing problems and delays.

The above-incorporated Scott et al U.S. Pat. No. 4,767,515 discloses a method and system wherein droplets of a dispersed (e.g. aqueous) phase are introduced to a counter-current flow of a continuous (e.g. organic liquid) phase and are shattered by a high intensity pulsating electric field. These shattered droplets form an emulsion comprising a plurality of much smaller daughter droplets, which have a greater combined surface area for interfacial mass transfer than the original droplets. The daughter droplets coalesce into larger droplets of the dispersed phase material, which larger droplets then separate out of the continuous phase material.

An aspect of the method and system of Scott et al U.S. Pat. No. 4,767,515 which can benefit from improvement is that there is a tendency for the emulsion created by the electric field to be carried farther than desirable in the direction of the flow of the continuous phase, decreasing opportunity for coalescence.

SUMMARY OF THE INVENTION

Accordingly, it is an object of the invention to provide methods and systems for controlling and stabilizing the emulsion phase of an electric field driven phase contactor such as may be employed in a solvent extraction process.

It is another object of the invention to provide methods and systems for confining an emulsion to a particular region in an electric field driven phase contactor.

It is yet another object of the invention to provide a method and system for enhancing the coalescence characteristics of an emulsion to improve phase separation and system throughput.

In accordance with one aspect, the invention provides a method for solvent extraction including the steps of introducing initial droplets of a dispersed phase liquid material containing ferromagnetic materials, such as aqueous droplets containing ferromagnetic particles, to a counter-current flow of a continuous phase, such as an organic liquid. A high intensity pulsed electric field is applied to the initial droplets, preferably as they are formed at a nozzle, so as to shatter the initial droplets into a ferromagnetic emulsion comprising many smaller daughter droplets of the dispersed phase material in the continuous phase. The daughter droplets accordingly have a greater combined total surface area than that of the initial droplets in contact with the continuous phase material. The method further includes applying a magnetic field to the ferromagnetic emulsion to control the position of the emulsion within the continuous phase. The daughter droplets are coalesced into larger reformed droplets, and the reformed droplets are separated from the continuous phase.

In accordance with another aspect of the invention, a phase contactor, such as a system for solvent extraction, includes a column for transporting a dispersed phase and a continuous phase in counter-current. The continuous phase may be a relatively lighter organic liquid which flows upwardly, and the dispersed phase may be droplets of a relatively heavier aqueous liquid. The column includes an emulsification and coalescence region and at least a dispersed phase collection region. Also included are a source of dispersed phase liquid material containing ferromagnetic particles, and an element such as a nozzle for introducing into the emulsification and coalescence region initial droplets of the dispersed phase liquid material containing ferromagnetic particles to a counter-current flow of the continuous phase. Means are included for applying a high intensity pulsed electric field to the initial droplets in the emulsification and coalescence region so as to shatter the initial droplets, preferably as the initial droplets are formed, into a ferromagnetic emulsion comprising many smaller daughter droplets having a greater combined total surface area than that of the initial droplets. The daughter droplets coalesce into larger reformed droplets which travel through the continuous phase to the dispersed phase collection region. Significantly, in accordance with the invention the phase contactor also includes means for applying a magnetic field to the emulsification and coalescence region to control the position of the ferromagnetic emulsion, whereby coalescence and phase separation are enhanced.

In accordance with another aspect of the invention, a comprehensive phase contactor system includes a source of dispersed phase liquid material such as an aqueous liquid, a source of continuous phase material such as an organic liquid, and a source of ferromagnetic particles. The system includes a mixer which receives and mixes the dispersed phase liquid material and the ferromagnetic particles to form a mixture of dispersed phase liquid material and ferromagnetic particles in the form of a slurry.

The phase contactor system further includes a counter-current phase contactor in turn including a column having an intermediate emulsification and coalescence region, a dispersed phase collection region located in one direction with respect to the emulsification region, for example below the emulsification and coalescence region in the case of a relatively heavier aqueous liquid as the dispersed phase material, and a continuous phase collection region located in an opposite direction with respect to the emulsification and coalescence region, for example above the emulsification and coalescence region in the case of a continuous phase comprising a relatively lighter organic liquid. The counter-current phase contactor additionally includes means connected to the continuous phase material source for establishing a flow of continuous phase material through the intermediate emulsification and coalescence region to the continuous phase collection region. A means is connected to the mixer for introducing into the emulsification and coalescence region initial droplets of the mixture. Means such as electrodes connected to a high voltage source are included for applying a high intensity pulsed electric field to the initial droplets in the emulsification and coalescence region, preferably as they are formed, so as to shatter the initial droplets into a ferromagnetic emulsion comprising many smaller daughter droplets having a greater combined surface area than that of the initial droplets, the surface area of the daughter droplets being in contact with the continuous phase material. The daughter droplets coalesce into larger reformed droplets which travel through the continuous phase to the dispersed phase collection region, for example, downwardly.

Significantly, in accordance with the invention a means for applying a magnetic field to the emulsification and coalescence region is included to control the position of the ferromagnetic emulsion, whereby coalescence and phase separation are enhanced. Finally, a separator is connected to the dispersed phase collection region for receiving the mixture therein and for separating the ferromagnetic particles from the dispersed phase liquid material.

Preferably, the phase contactor system of the invention recycles the ferromagnetic particles, and the ferromagnetic particles from the separator are recycled as an input to the mixer as the source of ferromagnetic particles.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE PREFERRED EMBODIMENTS

Figure 1:
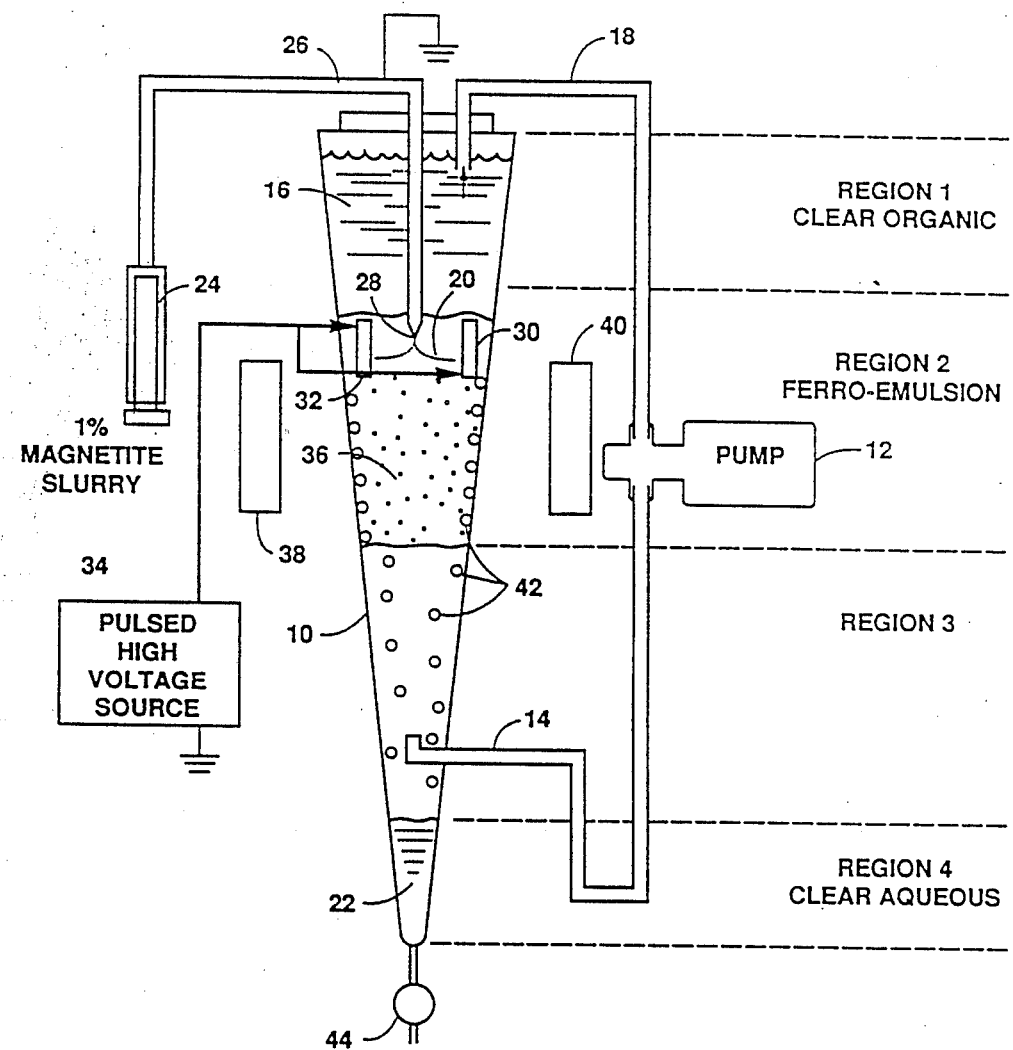
FIG. 1 depicts an electrically-driven ferro-emulsion phase contactor in the exemplary form of solvent extraction apparatus.

Referring now to FIG. 1, a phase contactor, which may be employed for solvent extraction, includes a column 10 for transporting liquids in counter-current fashion. As depicted in FIG. 1, the column 10 is vertically subdivided into four general regions. At an intermediate portion of the column 10 is an emulsification and coalescence region 2, wherein, by means described hereinbelow, a magnetically-stabilized ferro-emulsion is produced and contained.

During operation, a continuous organic liquid phase comprising, for example, 2-ethyl-1-hexanol, continuously flows upwardly through the column 10. More particularly, in the exemplary system of FIG. 1, a recirculation pump 12 is provided which introduces the organic continuous phase liquid into region 3 via a conduit 14. The continuous phase organic liquid flows upwardly within the column 10 through the emulsification and coalescence region 2 to ultimately collect as clear continuous phase material 16 in a continuous phase collection region 1 at the top of the column 10. Via a conduit 18, the pump 12 withdraws organic liquid from the continuous phase collection region 1 for recirculation or transport to another process.

Against and in counter-current to this flow of continuous phase material, dispersed phase liquid material is introduced in the form of initial droplets 20 into the emulsification and coalescence region 2 and flows generally in a downward direction towards a dispersed phase collection region 4 at the bottom of the column 10 to ultimately collect as clear dispersed phase liquid 22. More particularly, a reservoir and pump assembly 24 is provided for introducing aqueous liquid containing one percent by weight magnetite ($Fe_3O_4$) particles in the form of a slurry. The size of these ferromagnetic particles can range from as small as 100 Angstroms in diameter to as large as 100 microns in diameter. The slurry is transported within a conduit 26 and introduced through a nozzle 28 as the initial droplets 20 into the emulsification and coalescence region 2.

Preferably, as they are formed and emerge from the nozzle 28 into the emulsification and coalescence region 2, the initial droplets 20 are immediately dispersed by a high intensity pulsed electric field. For applying the high intensity pulsed electric field, a representative pair of electrodes 30 and 32 is provided, and both are connected for supply from a pulsed high voltage source 34 having characteristics as disclosed in the above-incorporated U.S. Pat. No. 4,767,515. The nozzle 28 is grounded such that the pulsed electric field is developed between the nozzle 28 and the electrode pair 30, 32.

Alternatively, and as in the embodiment described in U.S. Pat. No. 4,767,515, the pulsed electric field is developed between the electrodes 30 and 32 themselves, without involving the nozzle 28, by connecting the electrodes 30 and 32 to the pulsed high voltage source and grounding the nozzle 28. In this alternative, initial droplets 28 are allowed to free fall as droplets for a distance through the continuous phase material before entering the high intensity pulsed electric field.

In either case, and as described in U.S. Pat. No. 4,767,515, the initial droplets 20 shatter into an emulsion 36 comprising many smaller daughter droplets having a greater combined total surface area than that of the initial droplets 20. In the practice of the present invention, due to the presence of ferromagnetic particles, the emulsion 36 formed by the daughter droplets is a ferromagnetic emulsion. Stated in other words, the ferromagnetic particles within the dispersed phase function as a "packing material" to create a ferromagnetic emulsion upon rupture of the initial droplets 20.

For controlling the position of the ferromagnetic emulsion 36, a magnet having poles 38 and 40 is provided, thereby applying a magnetic field to the coalescence and phase separation region 2. It will be appreciated that any suitable means may be employed to form the magnetic field. Homogenous magnetic fields, or magnetic fields with gradients can be used to control the position of the ferromagnetic emulsion 36 with respect to the up-flowing continuous organic liquid phase.

Under the influence of the magnetic field, the ferromagnetic particles tend to agglomerate, causing retention of smaller droplets of dispersed phase within the field, and an increased number of droplet collisions wherein coalescence occurs.

As stated hereinabove, the ferromagnetic particles can range in diameter from as small as 100 Angstroms to as large as 100 microns in the practice of the invention. The characteristics of the nozzle 28 are selected to control initial droplet 20 volume such that each ferromagnetic particle, regardless of its size, is carried with about the same volume of dispersed phase liquid. If very small ferromagnetic particles are used, then each daughter droplet may include several ferromagnetic particles, with daughter droplet diameters in the approximate range of from 0.1 micron to 10 microns. If a ferromagnetic particle is large, such as a 100 micron particle, then the daughter droplet comprises a thin film covering the ferromagnetic particle, but with the volume of the film roughly equivalent to that of a micron size daughter droplet.

The daughter droplets comprising the emulsion 36 coalesce into larger reformed droplets 42 which travel downwardly through the upwardly flowing continuous phase organic liquid within the emulsification and coalescence region 2, as well as within the region 3, ultimately to collect in the dispersed phase collection region 4. Clear dispersed phase material 22 can be removed from the column 10 through a representative valve assembly 44.

As depicted in FIG. 1, the emulsion 36 is effectively confined within the emulsification and coalescence region 2, with individual daughter droplets neither being carried upwardly into the region 1, nor downwardly through region 3. The reformed droplets 42 however are sufficiently large to flow downward under the force of gravity and away from the magnetic field, notwithstanding the fact that they contain ferromagnetic particles.

Figure 2:
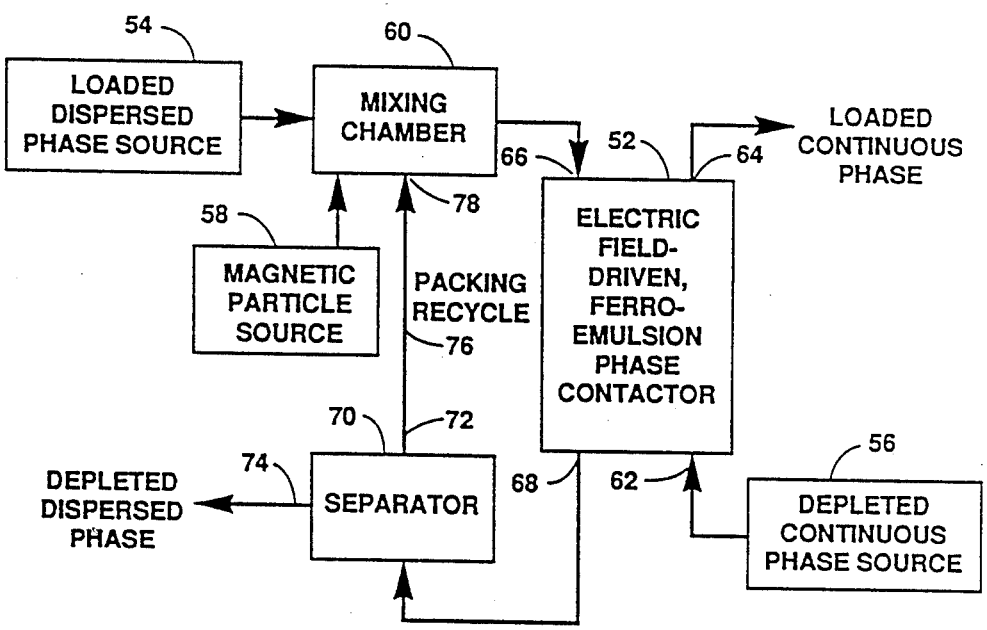
FIG. 2 is a conceptual block diagram of an electrically-driven ferro-emulsion phase contactor with ferromagnetic packing recycle.

With reference now to FIG. 2, shown in block diagram form is a comprehensive phase contactor system. The system of FIG. 2 includes an electric field-driven, ferro-emulsion phase contactor 52, which corresponds to the column 10 of FIG. 1, including the electrodes 30 and 32, as well as the magnet poles 38 and 40.

In FIG. 2, a source of dispersed phase liquid material is represented at 54, which may comprise an aqueous liquid which is "loaded" with a constituent to be removed by solvent extraction. Also represented in FIG. 2 at 56 is a source of depleted continuous phase material, for example, a liquid organic solvent, which is "depleted" in the sense it has not yet picked up the "loading" constituent.

Represented at 58 is a source of ferromagnetic particles, such as magnetite ($Fe_3O_4$), which enter a mixer 60 which may comprise a mixing chamber having inputs connected to the loaded dispersed phase source 54 and the magnetic particle source 58 to form a mixture or slurry of dispersed phase liquid material and ferromagnetic particles.

The continuous phase (e.g. organic liquid) solvent flows upwardly through the counter-current phase contactor 52, entering at 62 and exiting at 64, corresponding to the FIG. 1 entry via conduit 14 and exit via conduit 18. The continuous phase material leaving the phase contactor 52 at 64 is "loaded" in the sense that it has dissolved within it the particular "loading" constituent originally in the dispersed phase material.

At the same time, the mixture of dispersed phase liquid material and ferromagnetic particles from the mixing chamber 60 enters the phase contactor 52 at entry point 66, corresponding to the FIG. 1 nozzle 28. Collected dispersed phase material, still containing the magnetic particles but no longer containing the "loading" constituent, leaves at exit point 68, corresponding to FIG. 1 valve assembly 44, and enters a separator 70 which separates the ferromagnetic particles from dispersed phase liquid material. The separator 70 can function employing any suitable process, such as filtration, magnetic field removal, or centrifugation.

The ferromagnetic particles leave the separator 70 at exit point 72. The liquid aqueous dispersed phase material leaves the separator 70 via a path 74. The dispersed phase material is "depleted" in the sense that it no longer includes the "loading" constituent which has been removed by the organic solvent.

Preferably, the magnetic particles which function as a "packing material" are recycled along a path 76 from the separator 70 to enter the mixing chamber 60 at an input 78.

In view of the foregoing, it will be appreciated that the present invention provides an improved countercurrent phase contactor system useful particularly in solvent extraction processes. By effectively confining an emulsion which has a high interfacial surface area to a particular region, coalescence characteristics are enhanced for improved phase separation and system throughput. The invention may be applied to a variety of solvent extraction processes, such as nuclear fuel recycle operations, as well as used in an analytical laboratory.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for solvent extraction comprising the steps of:

introducing initial droplets of a dispersed phase liquid material containing ferromagnetic particles to a counter-current flow of a continuous phase;

applying a high intensity pulsed electric field to the initial droplets so as to shatter the initial droplets into a ferromagnetic emulsion comprising many smaller daughter droplets in the continuous phase, the daughter droplets having a greater combined total surface area than that of the initial droplets;

applying a magnetic field to the ferromagnetic emulsion to control the position of the ferromagnetic emulsion within the continuous phase;

coalescing a plurality of the daughter droplets into larger reformed droplets; and separating the reformed droplets from the continuous phase.

2. A method in accordance with claim 1, wherein said dispersed phase comprises aqueous droplets containing ferromagnetic particles, and said continuous phase comprises an organic liquid.

3. A phase contactor, comprising:

a column for transporting a dispersed phase and a continuous phase in counter-current, said column including an emulsification and coalescence region and a dispersed phase collection region;

a source of dispersed phase liquid material containing ferromagnetic particles;

an element for introducing into said emulsification and coalescence region initial droplets of the dispersed phase liquid material to a counter-current of the continuous phase;

means for applying a high intensity pulsed electric field to the initial droplets in said emulsification and coalescence region so as to shatter the initial droplets into a ferromagnetic emulsion comprising many smaller daughter droplets having a greater combined total surface area than that of the initial droplets, the daughter droplets coalescing into larger reformed droplets which travel through the continuous phase to said dispersed phase collection region; and means for applying a magnetic field to said emulsification and coalescence region to control the position of the ferromagnetic emulsion, whereby coalescence and phase separation are enhanced.

4. A phase contactor in accordance with claim 3, wherein said column transports a relatively lighter continuous phase organic liquid upwardly, and transports droplets of a relatively heavier dispersed phase aqueous liquid downwardly.

5. A phase contactor in accordance with claim 3, which comprises a system for solvent extraction.

6. A phase contactor system comprising:

a source of dispersed phase liquid material;

a source of continuous phase material;

a source of ferromagnetic particles;

a mixer having inputs connected to said dispersed phase liquid material source and to said ferromagnetic particle source for forming a mixture of dispersed phase liquid material and ferromagnetic particles;

a counter-current phase contactor including:

a column having an intermediate emulsification and coalescence region, a dispersed phase collection region located in one direction with respect to said emulsification and coalescence region, and a continuous phase collection region located in an opposite direction with respect to said emulsification and coalescence region, means connected to said continuous phase material source for establishing a flow of continuous phase material through said intermediate emulsification and coalescence region to said continuous phase collection region, means connected to said mixer for introducing into said emulsification and coalescence region initial droplets of the mixture, means for applying a high intensity pulsed electric field to the initial droplets in said emulsification and coalescence region so as to shatter the initial droplets into a ferromagnetic emulsion comprising many smaller daughter droplets having a greater combined total surface area than that of the initial droplets, the daughter droplets coalescing into larger reformed droplets which travel through the continuous phase to said dispersed phase collection region, and means for applying a magnetic field to said emulsification and coalescence region to control the position of the ferromagnetic emulsion, whereby coalescence and phase separation are enhanced; and a separator connected to said dispersed phase collection region for separating ferromagnetic particles from dispersed phase liquid material.

7. A system in accordance with claim 6, wherein ferromagnetic particles are recycled and said source of ferromagnetic particles comprises an output of said separator.

8. A system in accordance with claim 6, wherein:

said continuous phase collection region is located within said column above said emulsification and coalescence region, and said source of continuous phase material supplies a relatively lighter organic liquid which flows upwardly through said emulsification and coalescence region to said continuous phase collection region; and wherein said dispersed phase collection region is located within said column below said emulsification and coalescence region, and said source of dispersed phase liquid material supplies a relatively heavier aqueous liquid whereby the reformed droplets travel downwardly to said dispersed phase collection region.

* * * * *